US012128751B2

(12) United States Patent
Koshino et al.

(10) Patent No.: US 12,128,751 B2
(45) Date of Patent: Oct. 29, 2024

(54) VEHICLE BODY STRUCTURE

(71) Applicant: HONDA MOTOR CO., LTD., Tokyo (JP)

(72) Inventors: Takahiro Koshino, Tokyo (JP); Hiroyasu Takizawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 335 days.

(21) Appl. No.: 17/680,347

(22) Filed: Feb. 25, 2022

(65) Prior Publication Data

US 2022/0305898 A1  Sep. 29, 2022

(30) Foreign Application Priority Data

Mar. 25, 2021  (JP) ................................. 2021-050913

(51) Int. Cl.
*B60K 1/04* (2019.01)
*B62D 21/15* (2006.01)
*B62D 25/20* (2006.01)

(52) U.S. Cl.
CPC .............. *B60K 1/04* (2013.01); *B62D 21/155* (2013.01); *B62D 25/20* (2013.01); *B60K 2001/0438* (2013.01)

(58) Field of Classification Search
CPC .. B60K 1/04; B60K 2001/0416; B60K 11/06; B60K 2001/005; B60K 2001/0438; H01M 6/42; H01M 50/249; H01M 50/262; H01M 50/242; H01M 50/209; B60L 50/66; Y02T 10/70; B60Y 2200/91; B60Y 2200/92; Y02E 60/10; B62D 21/155; B62D 25/20

USPC ........................................................ 180/68.5
See application file for complete search history.

(56) References Cited

U.S. PATENT DOCUMENTS

| 8,728,648 | B2* | 5/2014 | Choo | ...................... B60L 50/66 |
| | | | | 429/96 |
| 9,873,456 | B2* | 1/2018 | Hara | ......................... B60K 1/04 |
| 9,987,912 | B2* | 6/2018 | Shinoda | ................... B60K 1/04 |
| 10,442,283 | B2* | 10/2019 | Kato | ....................... B60L 50/64 |

(Continued)

FOREIGN PATENT DOCUMENTS

| JP | 2009-012570 | 1/2009 |
| JP | 2014-221625 | 11/2014 |

(Continued)

OTHER PUBLICATIONS

Japanese Office Action for Japanese Patent Application No. 2021-050913 mailed Jan. 17, 2023.

*Primary Examiner* — James A Shriver, II
*Assistant Examiner* — Hilary L Johns
(74) *Attorney, Agent, or Firm* — Amin, Turocy & Watson, LLP

(57) ABSTRACT

This vehicle body structure includes a power storage device which is disposed in a recessed part formed in a floor part of a vehicle, in which the power storage device includes a laminate in which a plurality of cells are laminated, a pair of side plates provided at both end portions of the laminate in a vehicle width direction, a rear plate disposed on a vehicle rear side in the laminate, and a support member fixing the power storage device to the vehicle and supporting it in a suspending manner, and the rear plate includes a protection part extending from a lower side thereof toward a vehicle front side and positioned below the laminate and the side plates.

3 Claims, 10 Drawing Sheets

(56) References Cited

U.S. PATENT DOCUMENTS

| | | | | |
|---|---|---|---|---|
| 2013/0186700 A1* | 7/2013 | Choo | ................... | H01M 50/249 |
| | | | | 429/99 |
| 2013/0333962 A1* | 12/2013 | Lee | ......................... | B60L 50/60 |
| | | | | 429/152 |
| 2019/0047393 A1* | 2/2019 | Kato | ......................... | B60K 1/04 |

FOREIGN PATENT DOCUMENTS

| | | |
|---|---|---|
| JP | 2017-114190 | 6/2017 |
| JP | 2019-031251 | 2/2019 |
| JP | 2019-059478 | 4/2019 |
| JP | 6520424 | 5/2019 |

* cited by examiner

VEHICLE BODY STRUCTURE

CROSS-REFERENCE TO RELATED APPLICATION

The present application claims priority based on Japanese Patent Application No. 2021-050913, filed Mar. 25, 2021, the content of which is incorporated herein by reference.

BACKGROUND OF THE INVENTION

Field of the Invention

The present invention relates to a vehicle body structure.

Description of Related Art

For example, a vehicle that travels with an electric motor as a drive source such as a hybrid vehicle includes an on-board power storage device that supplies electricity to the electric motor. A power storage device is mounted, for example, behind a rear seat (hereinafter referred to as a seat), and a battery module is housed inside a case.

Here, for example, a luggage compartment pan is provided behind the seat, and a luggage compartment board is disposed above the luggage compartment pan. The luggage compartment pan is formed to be recessed downward with respect to the luggage compartment board. A storage space is formed between the luggage compartment pan and the luggage compartment board, and the power storage device is stored in the storage space.

Incidentally, among power storage devices, one in which a plurality of protruding parts are provided on a bottom surface part of a lower case in which a battery module is housed, and base brackets are provided at both end portions in a vehicle width direction of the plurality of protruding parts is known. Thereby, a rigidity of the case of the power storage device can be increased, and the battery module can be protected from deformation of the luggage compartment pan or the like of the vehicle (see, for example, Japanese Unexamined Patent Application, First Publication No. 2019-59478).

Also, among power storage devices, one in which a battery module is supported in a state of being suspended by a front suspension frame and a rear suspension frame and fragile parts are formed in the front suspension frame and the rear suspension frame is known. Therefore, for example, when an impact load is input from the rear, the front suspension frame and the rear suspension frame are deformed from the fragile parts and the battery module can be offset to the front. Thereby, an impact load can be released and the battery module can be protected (see, for example, Japanese Unexamined Patent Application, First Publication No. 2017-114190).

SUMMARY OF THE INVENTION

However, in the configuration of Japanese Unexamined Patent Application, First Publication No. 2019-59478, a member such as a base bracket is required to increase a rigidity of the case of the power storage device. Therefore, the number of parts or a weight of the power storage device may increase, and there is still room for improvement from this point of view.

Also, in the configuration of Japanese Unexamined Patent Application, First Publication No. 2017-114190, it is necessary to form fragile parts in the front suspension frame and the rear suspension frame so that the front suspension frame and the rear suspension frame are deformed from the fragile parts with respect to an impact load. Therefore, this serves as a factor that may cause an increase in size or costs of a frame structure supporting the power storage device, and there is still room for improvement from this point of view.

An aspect of the present invention is directed to providing a vehicle body structure capable of protecting a battery module without increasing the number of parts or a weight of a power storage device, and furthermore, without increasing a size or costs of a frame structure supporting the power storage device.

In order to achieve the above-described objective, a vehicle body structure according to an aspect of the present invention employs the following configuration.

(1) An aspect of the present invention is a vehicle body structure including a power storage device (for example, a power storage device 20 of an embodiment) which is disposed in a recessed part (for example, a luggage compartment pan 17 of the embodiment) formed in a floor part (for example, a luggage compartment board 16 of the embodiment) of a vehicle (for example, a vehicle 10 of the embodiment), in which the power storage device includes a laminate (for example, a battery 71 of the embodiment) in which a plurality of cells (for example, battery cells 77 of the embodiment) are laminated, a pair of side plates (for example, left and right side plates 72 and 73 of the embodiment) provided at both end portions (for example, left and right end portions 71a and 71b of a rectangular battery group of the embodiment) of the laminate in a vehicle width direction, a rear plate (for example, a rear plate 75 of the embodiment) disposed on a vehicle rear side in the laminate, and a support member (for example, a support member 66 of the embodiment) fixing the power storage device to the vehicle and supporting it in a suspending manner, and the rear plate includes a protection part (for example, a first protection part 91 of the embodiment) extending from a lower side thereof toward a vehicle front side and positioned below the laminate and the side plates.

Here, for example, when an impact load is input from the rear due to a rear surface collision, the recessed part of the vehicle is deformed to push the power storage device upward from below by the input impact load.

Therefore, the pair of side plates are provided at both end portions in the vehicle width direction of the laminate in which the plurality of cells are laminated. Also, the rear plate is disposed behind the laminate. The protection part is made to extend toward the front from a lower side of the rear plate, and the extended protection part is disposed below the laminate and the side plates.

According to the aspect (1) described above, when the recessed part is deformed to push the power storage device upward from below by an impact load, the deformed recessed part can be received by the protection part. Therefore, the load from the recessed part generated due to the push-up can be absorbed by the protection part, and the laminate (that is, the battery module) can be protected from the impact load.

Therefore, the battery module can be protected without increasing the number of parts or a weight of the power storage device, and furthermore, without increasing a size or costs of the frame structure supporting the power storage device.

(2) In the aspect (1) described above, the rear plate may be positioned on the vehicle front side with respect to a fragile part which is formed in a member (for example, a pan member 18 of the embodiment) provided below the recessed part and extending in a front-rear direction of the vehicle.

According to the aspect (2) described above, the member extending in the front-rear direction is provided below the recessed part, and the fragile part is formed in the member. The rear plate is disposed on a side in front of the fragile part. Therefore, the fragile part is provided behind the power storage device. Thereby, when an impact load is input to the member, the member can be pushed upward from the fragile part only at the rear of the power storage device.

Therefore, the load from the member or the recessed part generated due to the push-up can be absorbed by the first protection part. Thereby, there is no need to provide the protection part, for example, over the entire region of the laminate (that is, the battery module) in which a plurality of cells are laminated, and a setting range of the protection part can be kept as small as that of the first protection part.

(3) In the aspect (1) or (2) described above, the side plates may each include another protection part (for example, a second left protection part 85 and a second right protection part 86 of the embodiment) extending in the vehicle width direction from a lower side of the side plate.

According to the aspect (3) described above, the another protection part is made to extend in the vehicle width direction from the lower side of the side plate. Here, the protection part of the rear plate is positioned below the side plate. Therefore, the another protection part is disposed to overlap the protection part from a side to the rear to a side therebelow. Thereby, when a load due to the push-up from the member or the recessed part is input to the protection part, the protection part can be supported by the another protection part. Therefore, the protection part can be satisfactorily deformed by the load from the member or the recessed part, and the protection part can suitably absorb the load from the member or the recessed part.

(4) In the aspect (3) described above, the another protection part may extend outward in the vehicle width direction.

According to the aspect (4) described above, the second protection part is made to extend outward in the vehicle width direction. Therefore, the second protection part can be extended outward in the vehicle width direction of the laminate in which the plurality of cells are laminated. Thereby, the first protection part can be supported by the second protection part on an outer side in the vehicle width direction of the laminate. Therefore, for example, even when the second protection part is deformed by a load due to the push-up from the member or the recessed part, the second protection part coming into contact with the laminate in which the plurality of cells are laminated is curbed, and the laminate can be more satisfactorily protected.

Also, when the second protection part is made to extend outward in the vehicle width direction, a large region of the first protection part in the vehicle width direction can be secured. Thereby, the load due to the push-up from the member or the recessed part can be suitably absorbed by the first protection part, and thus the laminate can be more satisfactorily protected.

(5) In any one of the aspects (1) to (4) described above, an upper surface portion (for example, front upper end portions 72a and 73a and rear upper end portions 72b and 73b of the embodiment) of the side plate may be fixed to the support member.

According to the aspect (5) described above, the upper surface portion of the side plate is fixed to the support member. Therefore, the power storage device can be supported in a state of being suspended from the vehicle (vehicle body) via the support member. Thereby, for example, some of the load due to the push-up from the member or the recessed part can be transmitted (load path) to the vehicle (vehicle body). Thereby, deformation of the protection part due to the load from the member or the recessed part can be suppressed.

(6) In the aspect (3) or (4) described above, a portion (for example, a protruding part 97 of the embodiment) of the protection part which avoids the another protection part may protrude downward with respect to a portion thereof (for example, a first left protection part 95 and a first right protection part 96 of the embodiment) overlapping the another protection part.

According to the aspect (6) described above, a portion of the protection part which avoids the another protection part is made to protrude downward with respect to a portion thereof overlapping the another protection part. Therefore, sufficient deformation of the protection part can be secured with respect to the load due to the push-up from the member or the recessed part. Thereby, the load due to the push-up from the member or the recessed part can be more suitably protected by the portion of the protection part that is made to protrude downward.

According to the aspects of the present invention, the battery module can be protected without increasing the number of parts or a weight of the power storage device, and furthermore, without increasing a size or costs of the frame structure supporting the power storage device.

DESCRIPTION OF EMBODIMENTS

Figure 1:
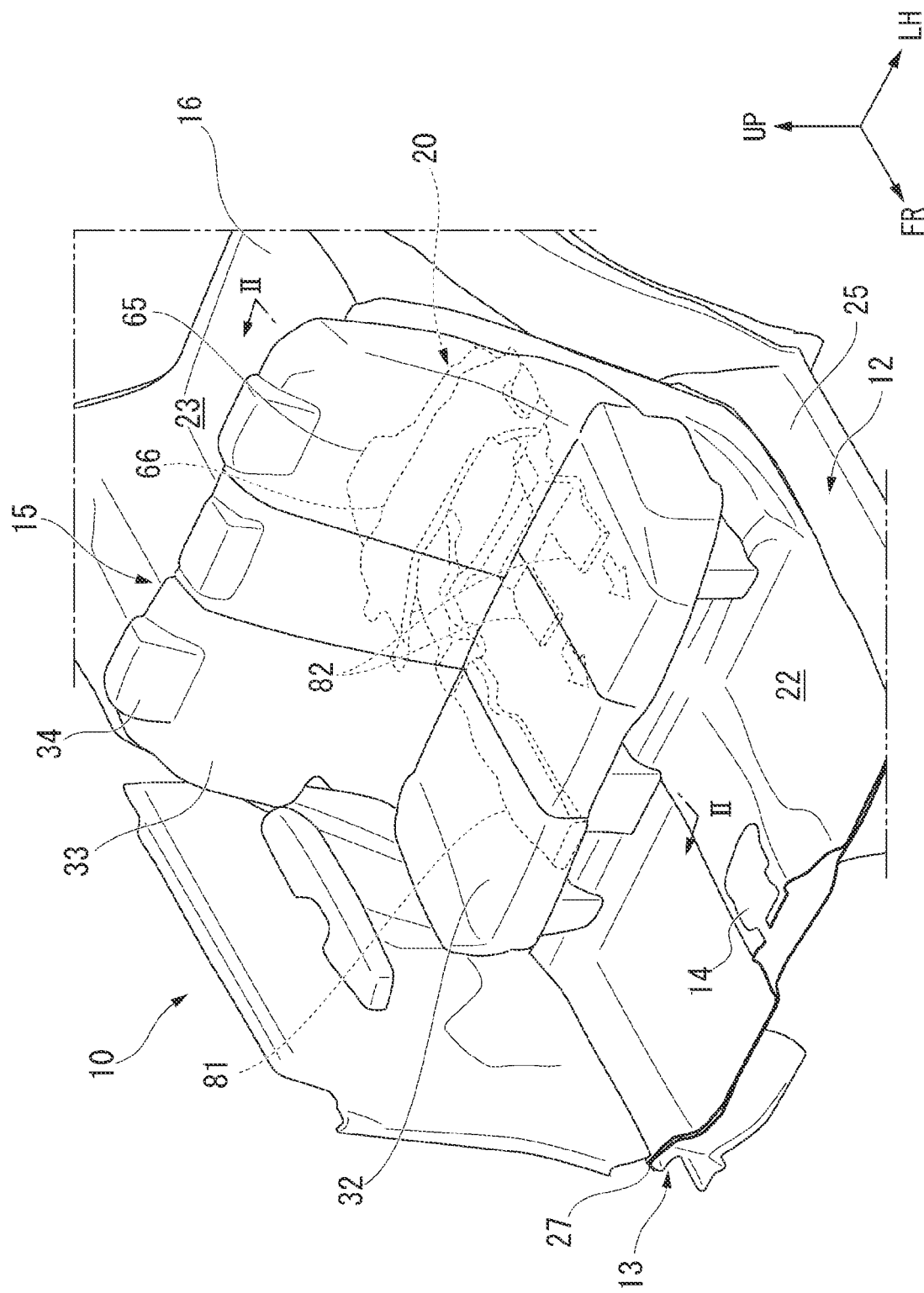
FIG. 1 is a perspective view of a vehicle having a power storage device of one embodiment according to the present invention as viewed from a left side in front.

Hereinafter, a vehicle 10 having a vehicle body structure according to one embodiment will be described on the basis of the drawings of the embodiment of the present invention. In the drawings, an arrow FR indicates toward the front of the vehicle 10, an arrow UP indicates toward the top of the vehicle 10, and an arrow LH indicates toward the left of the vehicle. A front-rear direction of the vehicle 10 may be simply referred to as a front-rear direction. Also, in the embodiment, for example, an example in which the present invention is applied to a two-row seat vehicle will be described, but as another example, the present invention may also be applied to, for example, a three-row seat vehicle.

<Vehicle>

Figure 2:
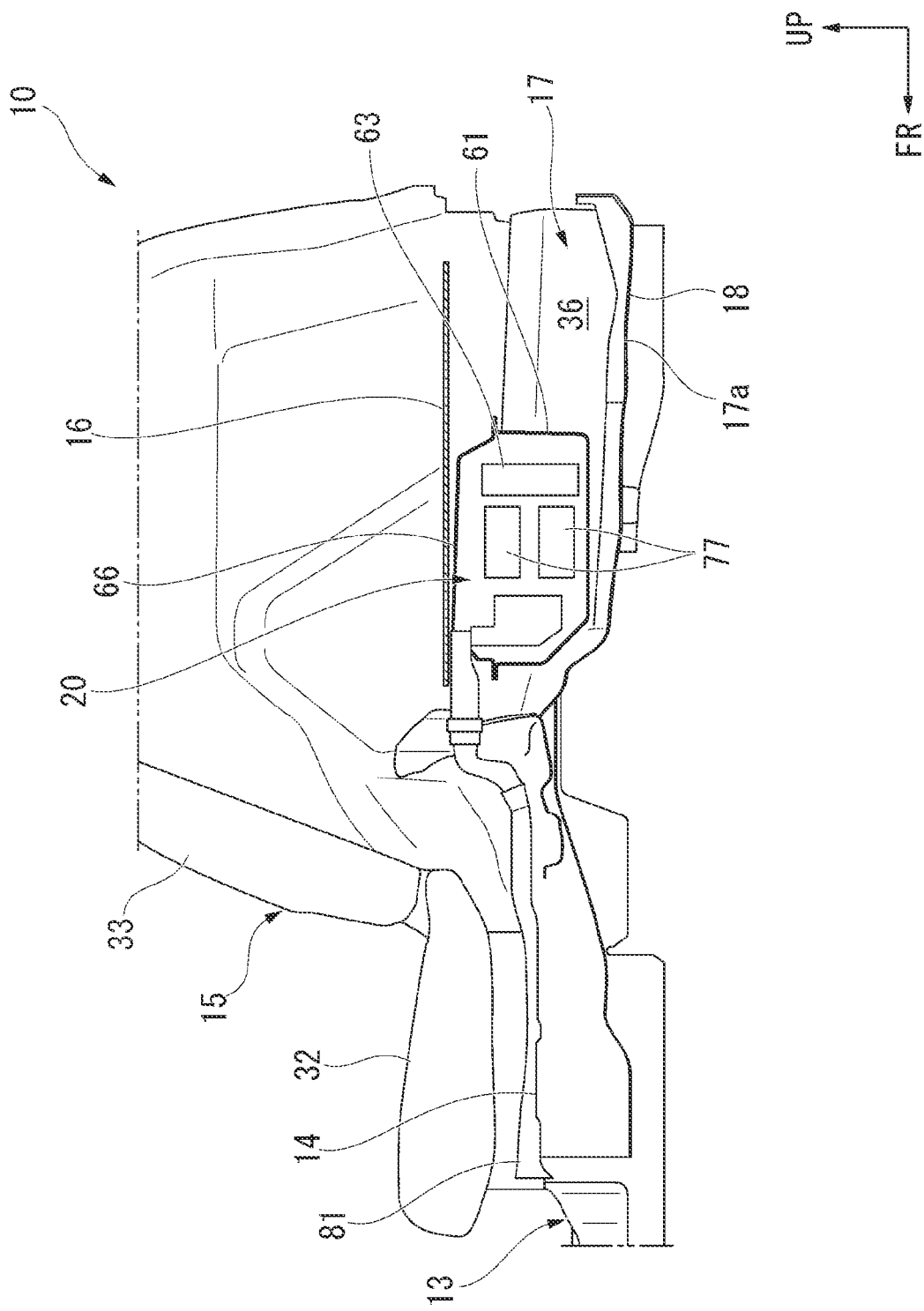
FIG. 2 is a cross-sectional view cut along line II-II of FIG. 1.

As illustrated in FIGS. 1 and 2, the vehicle 10 is an electric vehicle such as a hybrid vehicle that travels with an electric motor as a drive source as an example. The vehicle 10 includes, for example, left and right side frames 12 and 13, a floor panel 14, a second-row rear seat (seat) 15, a luggage compartment board (floor part) 16, a luggage compartment pan (recessed part) 17, a pan member (member) 18, and a power storage device 20 of the vehicle. Hereinafter, the second-row rear seat 15 may be abbreviated as a "seat 15."

<Side Frame>

Figure 3:
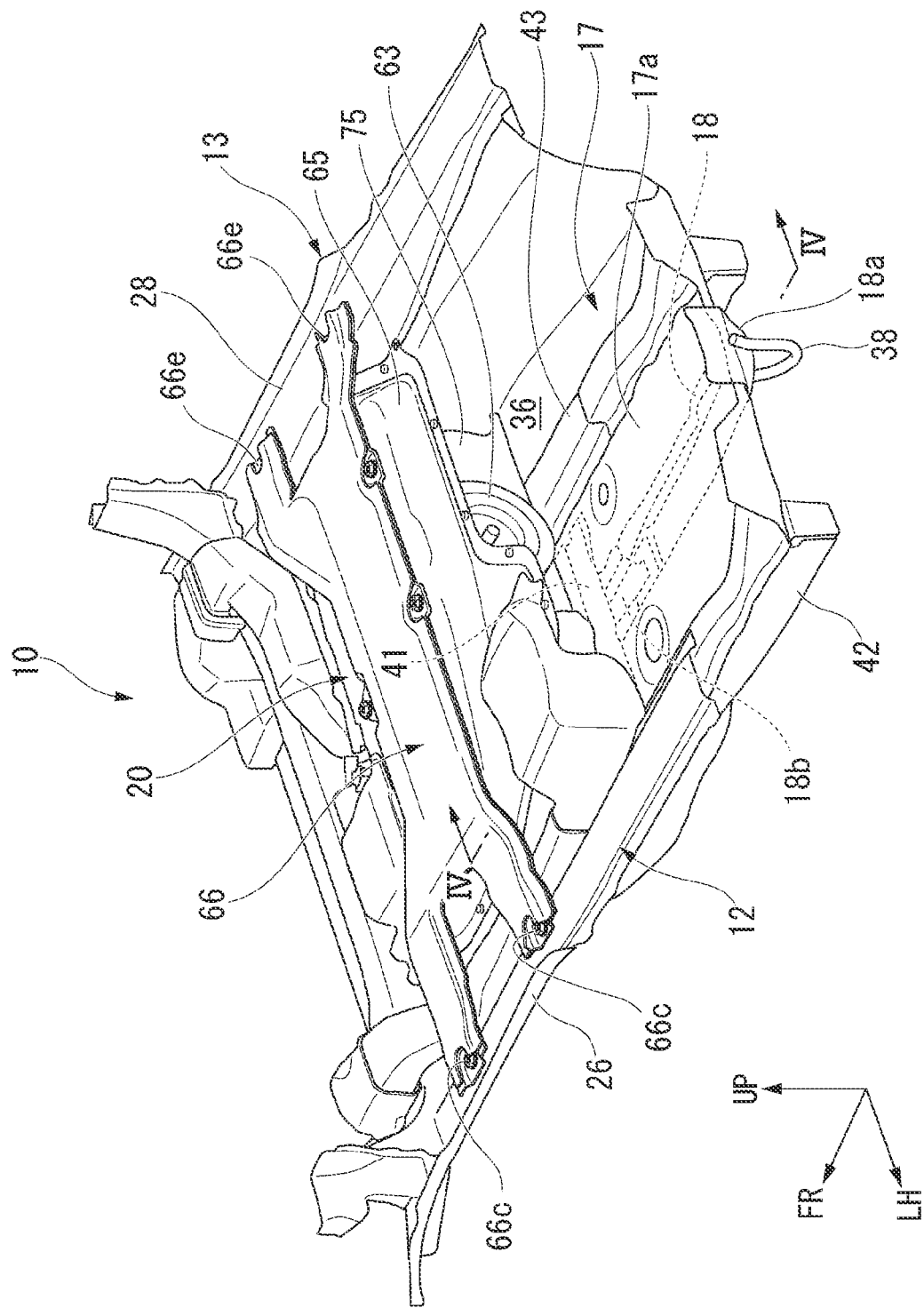
FIG. 3 is a perspective view of the vehicle in which the power storage device of one embodiment is disposed in a luggage compartment pan as viewed from a left side in the rear.

As illustrated in FIGS. 1 and 3, the left side frame 12 is constituted by, for example, a left side sill 25 provided on a left outer side of a passenger compartment 22 and a left rear frame 26 provided on a left outer side of a luggage compartment 23. The left side frame 12 is a hollow member having high rigidity formed in, for example, a rectangular closed cross section.

The right side frame 13 is constituted by, for example, a right side sill 27 provided on a right outer side of the passenger compartment 22 and a right rear frame 28 provided on a right outer side of the luggage compartment 23. The right side frame 13 is, for example, a hollow member having high rigidity formed in a rectangular closed cross section as in the left side frame 12.

The floor panel 14 is supported between the left side sill 25 and the right side sill 27. The floor panel 14 forms a floor surface of the passenger compartment 22.

<Seat>

As illustrated in FIGS. 1 and 2, the seat 15 is attached to the floor panel 14. The seat 15 includes a seat cushion (seating surface part) 32, a seatback (backrest part) 33, and a headrest 34.

<Luggage Compartment Board, Luggage Compartment Pan>

As illustrated in FIGS. 2 and 3, the luggage compartment board 16 forms a floor surface of the luggage compartment 23 in a state in which it is detachably attached to the left rear frame 26 and the right rear frame 28. The luggage compartment pan 17 is formed below the luggage compartment board 16. The luggage compartment pan 17 is provided on the left rear frame 26 and the right rear frame 28 and is positioned behind the seat 15. The luggage compartment pan 17 is formed to be recessed downward in a concave shape from the luggage compartment board 16. A storage space 36 is formed between the luggage compartment board 16 and the luggage compartment pan 17.

The power storage device 20 is stored (disposed) in the storage space 36. In this state, the power storage device 20 is disposed inside the luggage compartment pan 17. The power storage device 20 will be described in detail later.

<Pan Member>

Figure 4:
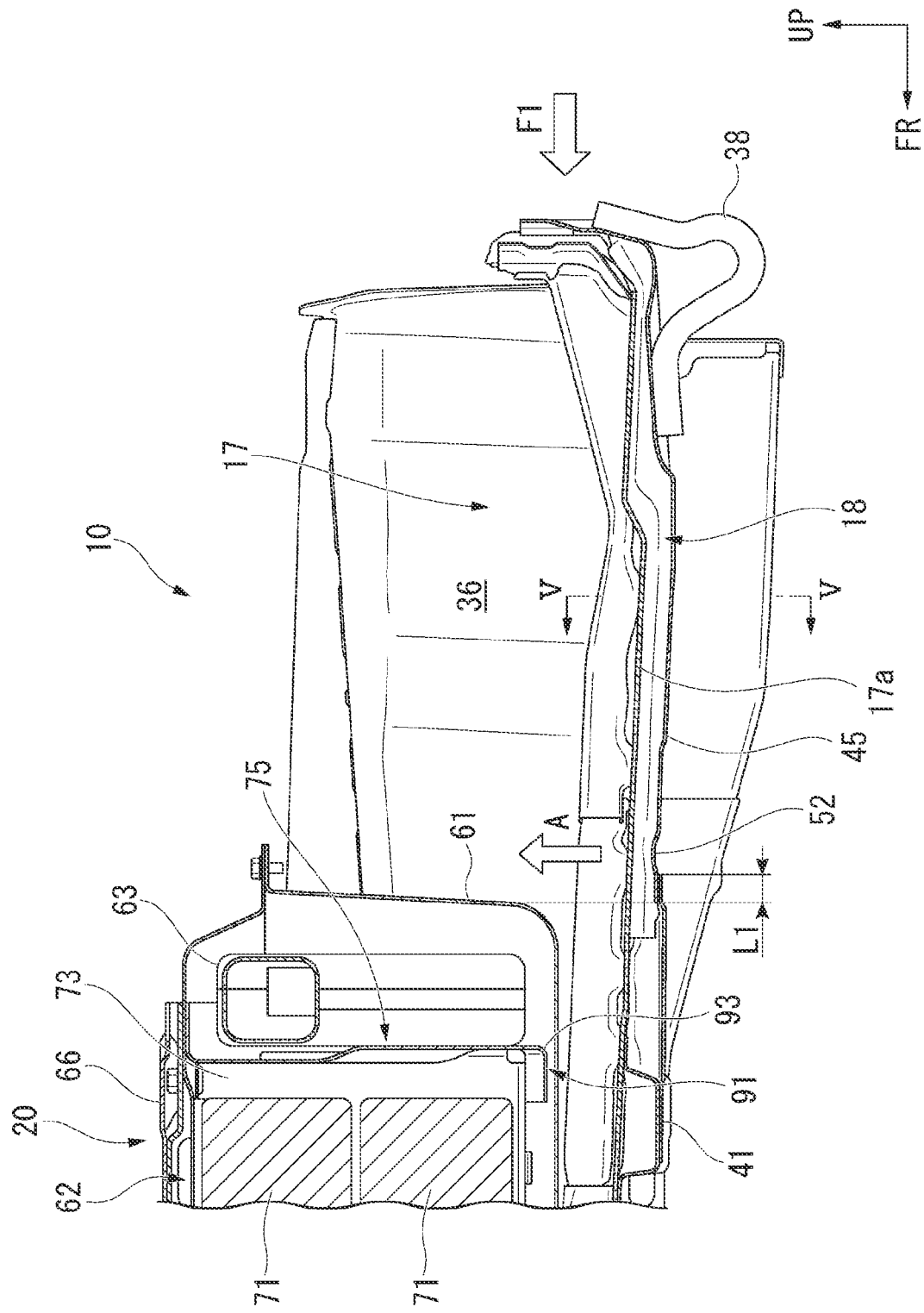
FIG. 4 is a cross-sectional view cut along line IV-IV of FIG. 3.

As illustrated in FIGS. 3 and 4, a pan member 18 is provided on a bottom portion 17a of the luggage compartment pan 17. Hereinafter, the bottom portion 17a of the luggage compartment pan 17 may also be referred to as a "pan bottom portion 17a." The pan member 18 is attached at a portion of the pan bottom portion 17a at a center in a vehicle width direction from below and extends in the front-rear direction. That is, the pan member 18 is provided below the luggage compartment pan 17 and extends in the front-rear direction. A rear tow hook 38 is provided at a rear end portion 18a of the pan member 18.

A front end portion 18b of the pan member 18 is connected to a cross member 41. The cross member 41 is connected to a left pan frame 42 and a right pan frame 43. The left pan frame 42 and the right pan frame 43 are respectively attached to a left side of the pan member 18 in the vehicle width direction and a right side of the pan member 18 in the vehicle width direction at the pan bottom portion 17a.

Figure 5:
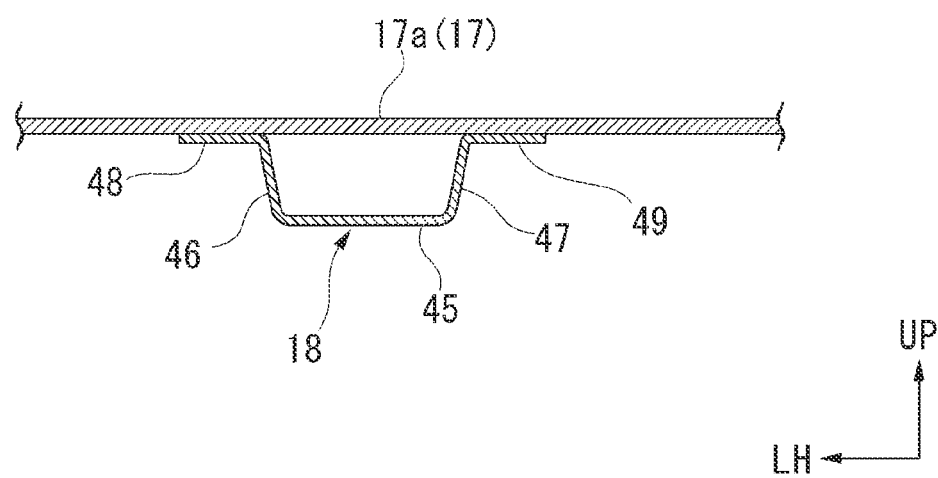
FIG. 5 is a cross-sectional view cut along line V-V of FIG. 4.

As illustrated in FIG. 5, the pan member 18 is formed in a cross-sectional hat shape by, for example, a member bottom portion 45, a member left side wall 46, a member right side wall 47, a member left flange 48, and a member right flange 49. In the pan member 18, the member left flange 48 and the member right flange 49 are joined to the pan bottom portion 17a from below.

As illustrated in FIG. 4, the pan member 18 has a fragile part 52. The fragile part 52 is formed at a position separated rearward by L1 with respect to the power storage device 20. Specifically, the fragile part 52 is formed so that the member bottom portion 45 is recessed upward and extends in the vehicle width direction.

Further, in the embodiment, an example in which the member bottom portion 45 is recessed upward to form the fragile part 52 will be described, but as another example, the fragile part 52 may be formed in another shape such as a thin wall part or an opening.

When the fragile part 52 is provided in the pan member 18, for example, when an impact load F1 is input to a rear portion of the vehicle, the pan member 18 can be deformed to be pushed upward as illustrated by an arrow A with the fragile part 52 as a starting point. Also, following the pushing up of the pan member 18, the pan bottom portion 17a can also be deformed by being pushed upward.

Here, the fragile part 52 is provided behind the power storage device 20. Thereby, the pan member 18 and the pan bottom portion 17a can be pushed upward only at the rear of the power storage device 20 with the fragile part 52 as a starting point.

<Power Storage Device>

Figure 6:
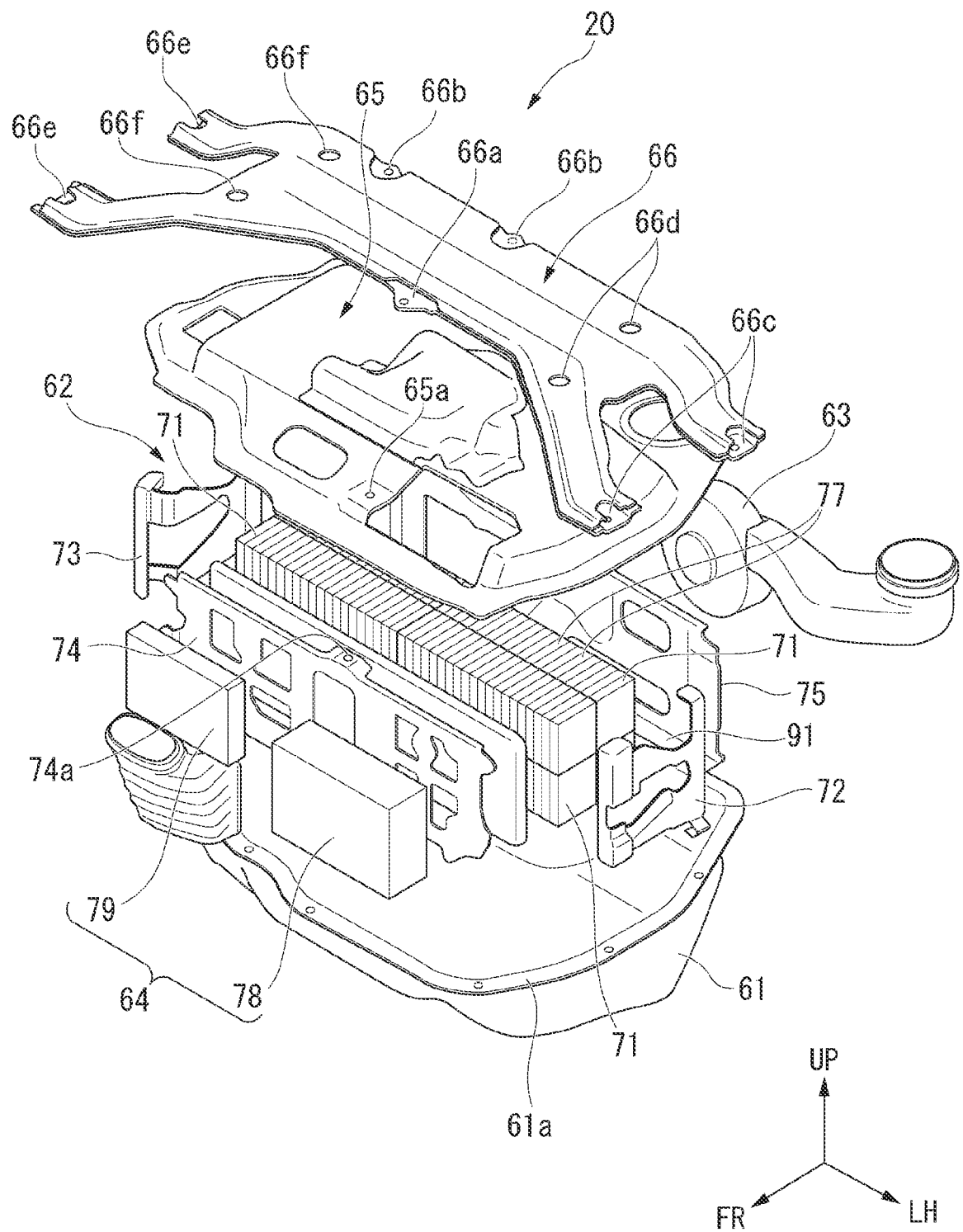
FIG. 6 is an exploded perspective view of the power storage device of one embodiment.

As illustrated in FIGS. 2, 3, and 6, the power storage device 20 is disposed in the storage space 36 between the luggage compartment board 16 and the luggage compartment pan 17. The power storage device 20 is disposed on a side in front of the fragile part 52. The power storage device 20 includes a housing part (case) 61, a battery module 62, a blower fan 63, a control unit 64, a cover part 65, and a support member 66.

<Battery Module>

The housing part 61 is disposed on a side in front of the fragile part 52 (see FIG. 4). The housing part 61 has an upper surface 61a that is open and houses the battery module 62, the blower fan 63, the control unit 64, and the like. The battery module 62 includes, for example, a plurality of batteries (laminate) 71, left and right side plates (a pair of side plates) 72 and 73, a front plate 74, and a rear plate 75.

The plurality of batteries 71 are disposed, for example, in the vehicle width direction and disposed in two upper and lower stages to form a rectangular body shape extending in the vehicle width direction. The batteries 71 are each formed by, for example, laminating a plurality of battery cells (cells) 77 in the vehicle width direction.

Hereinafter, the plurality of batteries 71 formed in a rectangular body shape may also be referred to as a "rectangular battery group 71."

Figure 7:
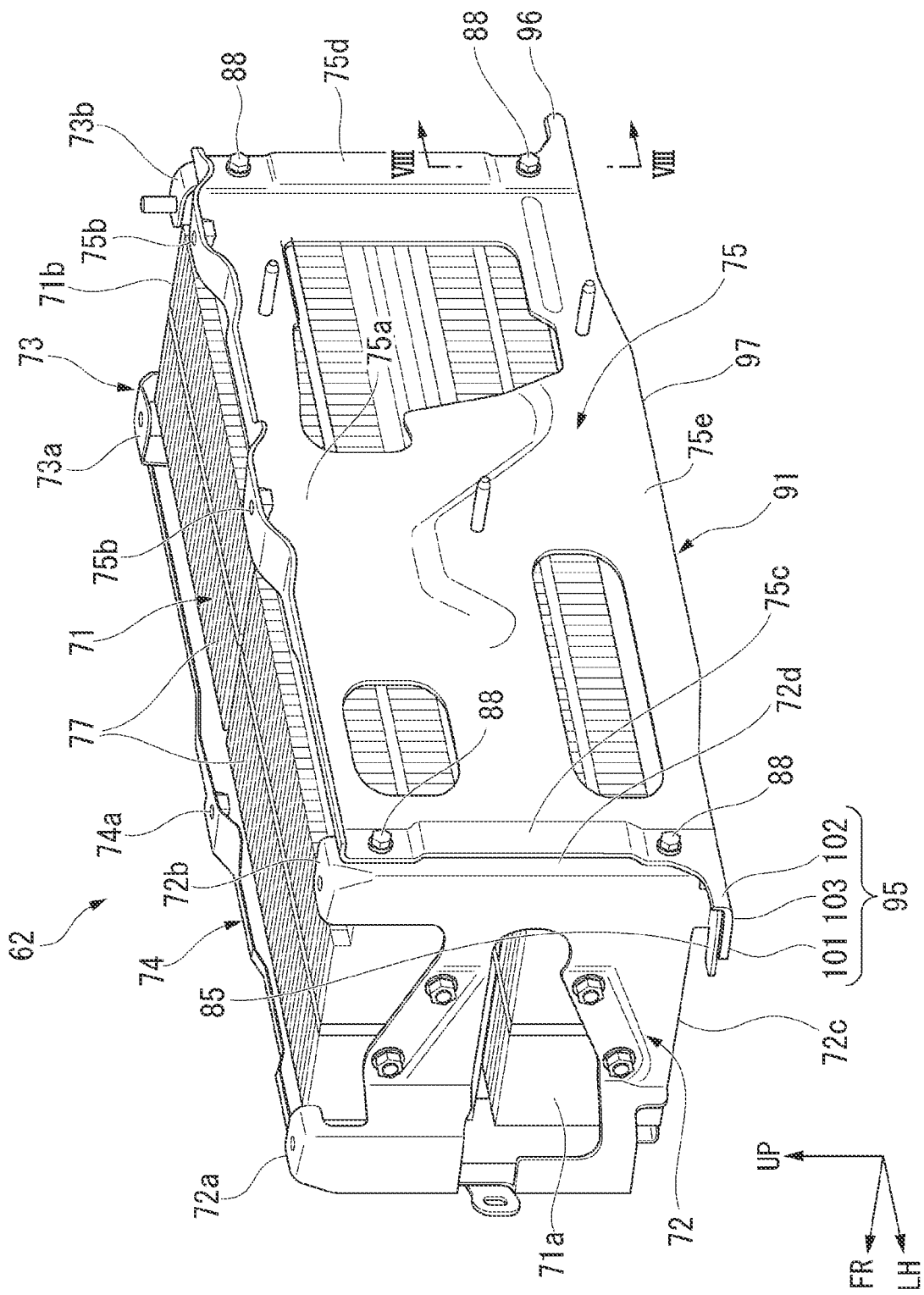
FIG. 7 is a perspective view of a battery module provided in the power storage device of one embodiment as viewed from the rear.

As illustrated in FIGS. 6 and 7, the left side plate 72 is disposed at a left end portion (one of both end portions) 71a of the rectangular battery group 71 in the vehicle width direction, and the right side plate 73 is disposed at a right end portion (the other of both end portions) 71b thereof in the vehicle width direction.

Also, the front plate 74 is disposed along a front surface on a side in front of the rectangular battery group 71. Further, the rear plate 75 is disposed along a rear surface on a side behind the rectangular battery group 71. The plurality of batteries 71 are supported in a state of the rectangular body-shaped rectangular battery group 71 by the left and right side plates 72 and 73, the front plate 74, and the rear plate 75.

The left and right side plates 72 and 73 and the rear plate 75 will be described in detail later.

The blower fan 63 is housed on a side behind the rear plate 75 of the battery module 62 inside the housing part 61. When the blower fan 63 is driven, air in the passenger compartment 22 is guided to the plurality of batteries 71 (that is, the battery module 62) through an intake duct 81 (see FIG. 1), and the guided air cools the plurality of batteries 71. The air that has cooled the plurality of batteries 71 is guided to the passenger compartment from an exhaust duct 82 (see FIG. 1) via the blower fan 63.

The control unit 64 is supported by, for example, the front plate 74. The control unit 64 includes a high-voltage junction board 78 and an electronic control unit (ECU) 79. The high-voltage junction board 78 is, for example, an auxiliary device that supplies electricity of the battery module 62 to a drive motor (not illustrated). The ECU 79 is, for example, a battery management unit that controls discharging and charging between the battery module 62 and the drive motor.

The high-voltage junction board 78 and the ECU 79 are housed on a side in front of the battery module 62 inside the housing part 61.

The cover part 65 is provided on the upper surface 61a of the housing part 61. Since the cover part 65 is provided on the upper surface 61a of the housing part 61, the upper surface 61a of the housing part 61 is covered with the cover part 65.

As described above, the power storage device 20 forms a power supply circuit control device in which the battery module 62 and the control unit 64 are collectively housed inside the housing part 61.

<Support Member>

The support member 66 is disposed, for example, above the cover part 65 and is attached to the left and right side plates 72 and 73, the front plate 74, and the rear plate 75 together with the cover part 65.

Specifically, a front end portion center 66a of the support member 66 is fixed, for example, to an upper end portion 74a of the front plate 74 together with a center portion 65a in the vehicle width direction of a front portion of the cover part 65 by a bolt and a nut. Also, two portions 66b and 66b of a rear end portion of the support member 66 are fixed, for example, to two portions 75b and 75b of an upper end portion 75a of the rear plate 75 together with two portions (not illustrated) of a rear portion of the cover part 65 by bolts and nuts.

Further, portions 66d of the support member 66 close to left end portions 66c are fixed, for example, to a front upper end portion (upper surface portion) 72a and a rear upper end portion (upper surface portion) 72b of the left side plate 72 together with a left end portion (not illustrated) of the cover part 65 by bolts and nuts.

In addition, portions 66f of the support member 66 close to right end portions 66e are fixed, for example, to a front upper end portion (upper surface portion) 73a and a rear upper end portion (upper surface portion) 73b of the right side plate 73 together with a right end portion of the cover part 65 by bolts and nuts.

As illustrated in FIG. 3, for example, the left end portions 66c of the support member 66 are fixed to the left rear frame 26 by bolts and nuts. Further, for example, the right end portions 66e of the support member 66 are fixed to the right rear frame 28 by bolts and nuts. Therefore, the power storage device 20 is supported in a state of being suspended from the left rear frame 26 and the right rear frame 28 (that is, the vehicle body of the vehicle 10) via the support member 66.

Here, the support member 66 is formed, for example, in a substantially closed cross section by an upper plate and a lower plate and is a member having high rigidity. Also, the left rear frame 26 and the right rear frame 28 are hollow members having high rigidity formed in, for example, a rectangular closed cross section. Therefore, the power storage device 20 is supported in a state of being firmly suspended from the left rear frame 26 and the right rear frame 28 (that is, the vehicle body of the vehicle 10) via the support member 66.

<Side Plate>

Figure 8:
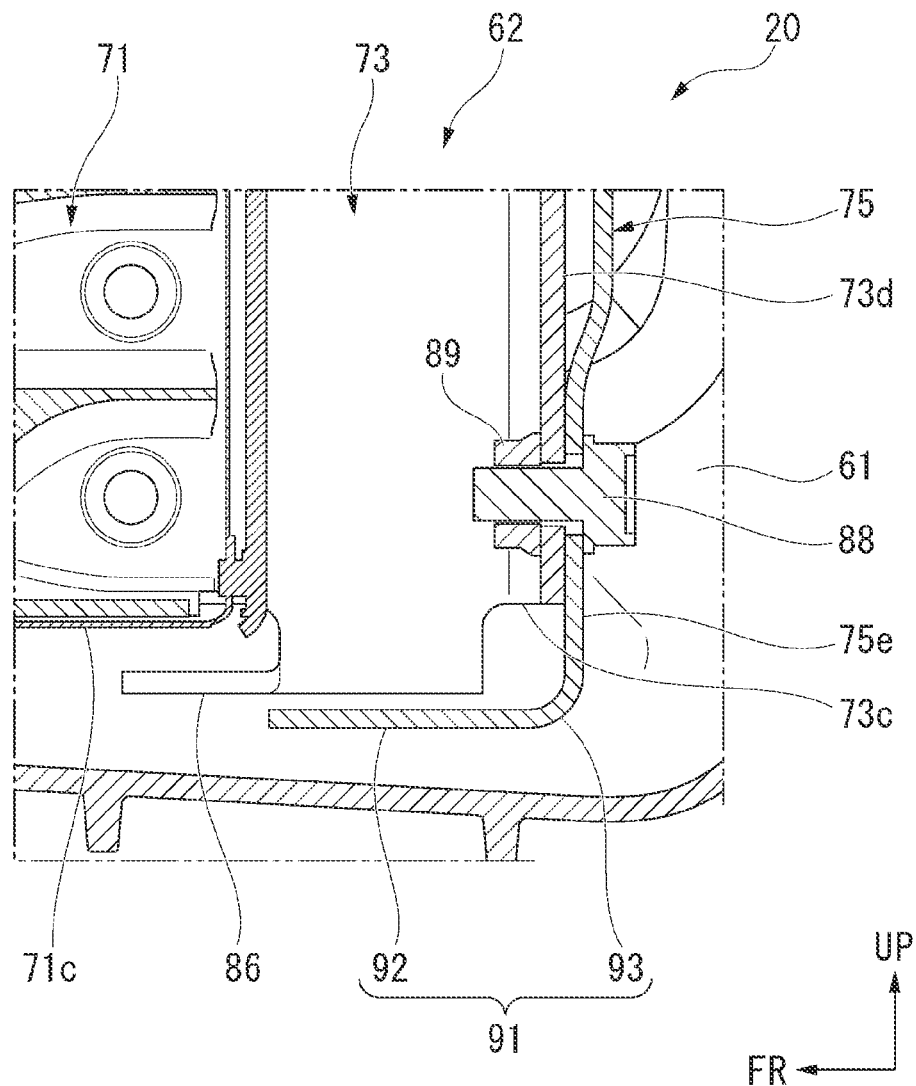
FIG. 8 is a cross-sectional view cut along the line VIII-VIII of FIG. 7.

As illustrated in FIGS. 6 to 8, the left side plate 72 is provided at the left end portion 71a of the rectangular battery group 71 in the vehicle width direction and is formed to cover the substantially rectangular left end portion 71a. The left side plate 72 includes a second left protection part (another protection part) 85 extending in the vehicle width direction from a lower side of the left side plate 72.

Specifically, the second left protection part 85 extends horizontally and flatly from a portion of a lower side 72c of the left side plate 72 adjacent to a rear end portion 72d toward the outside in the vehicle width direction (that is, on a side opposite to the rectangular battery group 71).

The right side plate 73 is formed to be substantially bilaterally symmetrical with respect to the left side plate 72. Therefore, detailed description of the right side plate 73 will be omitted.

Similarly to the left side plate 72, the right side plate 73 includes a second right protection part (another protection part) 86 extending in the vehicle width direction from a lower side of the right side plate 73.

Specifically, the second right protection part 86 extends horizontally and flatly from a portion of a lower side 73c of the right side plate 73 adjacent to a rear end portion 73d toward the outside in the vehicle width direction (that is, on a side opposite to the rectangular battery group 71).

<Rear Plate>

Figure 9:
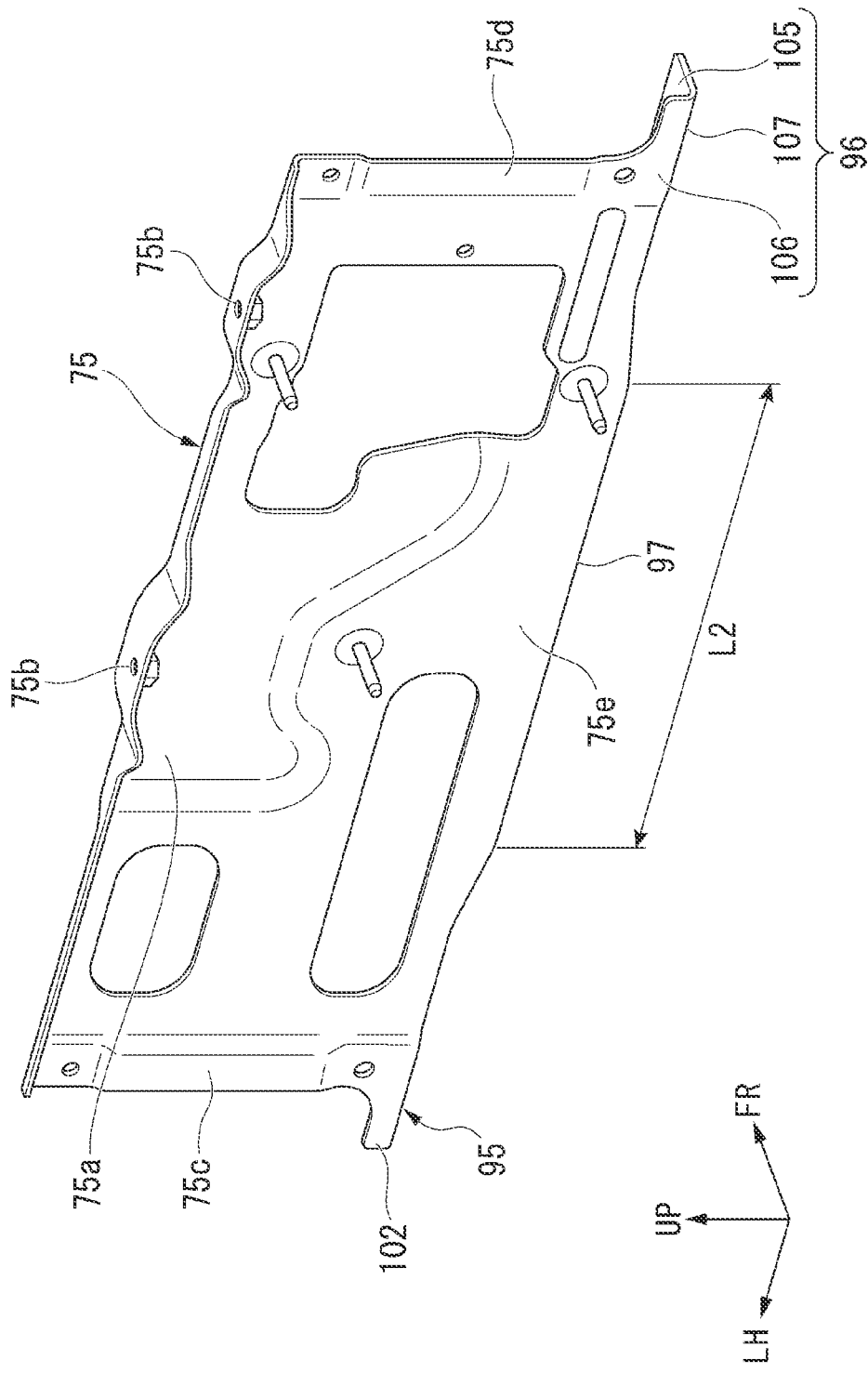
FIG. 9 is a perspective view of a rear plate provided in the battery module of one embodiment as viewed from the rear.

As illustrated in FIGS. 7 to 9, the rear plate 75 is fixed to the rear end portion 72d of the left side plate 72 and the rear end portion 73d of the right side plate 73. The rear plate 75 is formed in, for example, a substantially rectangular shape in a rear view to cover a rear surface on a side behind the rectangular battery group 71.

That is, the rear plate 75 is disposed behind the rectangular battery group 71 and in front of the fragile part 52 (see FIG. 4). In the rear plate 75, a left end portion 75c is fixed to the rear end portion 72d of the left side plate 72 by bolts 88 and nuts 89, and a right end portion 75d is fixed to the rear end portion 73d of the right side plate 73 by the bolts 88 and the nuts 89.

Further, as described above, the upper end portion 75a of the rear plate 75 is fixed, for example, to the two portions 66b of the rear end portion of the support member 66 (see FIG. 6) together with the two portions of the rear portion of the cover part 65 by bolts and nuts.

The rear plate 75 includes a first protection part (protection part) 91 at a lower end portion 75e. The first protection part 91 extends from the lower side of the rear plate 75 toward the front and is positioned below the rectangular battery group 71, the left side plate 72, and the right side plate 73.

Specifically, the first protection part 91 includes a protection horizontal part 92 and a protection corner part 93. The protection horizontal part 92 is made to extend toward the front from the lower end portion 75e of the rear plate 75. The protection horizontal part 92 is disposed at a distance below a lower surface 71c of the rectangular battery group 71, the lower side 72c of the left side plate 72, and the lower side 73c of the right side plate 73.

The protection corner part 93 is formed in a convex angle shape to protrude toward the outside (that is, rearward and downward) of the battery module 62 at a portion in which the lower end portion 75e of the rear plate 75 and the protection horizontal part 92 intersect. When the protection corner part 93 is formed in the first protection part 91, a rigidity of the first protection part 91 is increased.

Further, the first protection part 91 includes a first left protection part 95, a first right protection part 96, and a protruding part 97. The first left protection part 95 is a portion forming a left end portion of the first protection part 91 and extends outward in the vehicle width direction from a left lower end portion of the rear plate 75. The first left protection part 95 is disposed at a position overlapping the second left protection part 85 with a distance therebetween.

The first left protection part 95 includes a left protection horizontal part 101, a left protection vertical part 102, and a left protection corner part 103. The left protection horizontal part 101 is a portion forming a left end portion of the protection horizontal part 92 and is disposed at a distance below the second left protection part 85. The left protection vertical part 102 extends outward in the vehicle width direction from a left lower end portion of the rear plate 75. The left protection corner part 103 is a portion forming a left end portion of the protection corner part 93 and is formed in a convex angle shape to protrude rearward and downward at a portion in which the left protection horizontal part 101 and the left protection vertical part 102 intersect.

The first right protection part 96 is formed to be substantially bilaterally symmetrical with respect to the first left protection part 95. Therefore, detailed description of the first right protection part 96 will be omitted.

A right protection horizontal part 105 of the first right protection part 96 is disposed at a position overlapping the second right protection part 86 with a distance therebetween. A right protection vertical part 106 of the first right protection part 96 extends outward in the vehicle width direction from a right lower end portion of the rear plate 75. A right protection corner part 107 of the first right protection part 96 is formed in a convex angle shape to protrude rearward and downward at a portion in which the right protection horizontal part 105 and the right protection vertical part 106 intersect.

The protruding part 97 is formed between the first left protection part 95 and the first right protection part 96. The protruding part 97 protrudes downward from the lower end portion 75e of the rear plate 75.

In other words, the protruding part 97 is a portion that avoids the second left protection part 85 and the second right protection part 86. The protruding part 97 protrudes downward with respect to portions overlapping the second left protection part 85 and the second right protection part 86 (that is, the first left protection part 95 and the first right protection part 96).

A range L2 in the vehicle width direction of the protruding part 97 is arbitrarily set between the first left protection part 95 and the first right protection part 96 from the viewpoint of, for example, a layout around the battery module 62.

Figure 10:
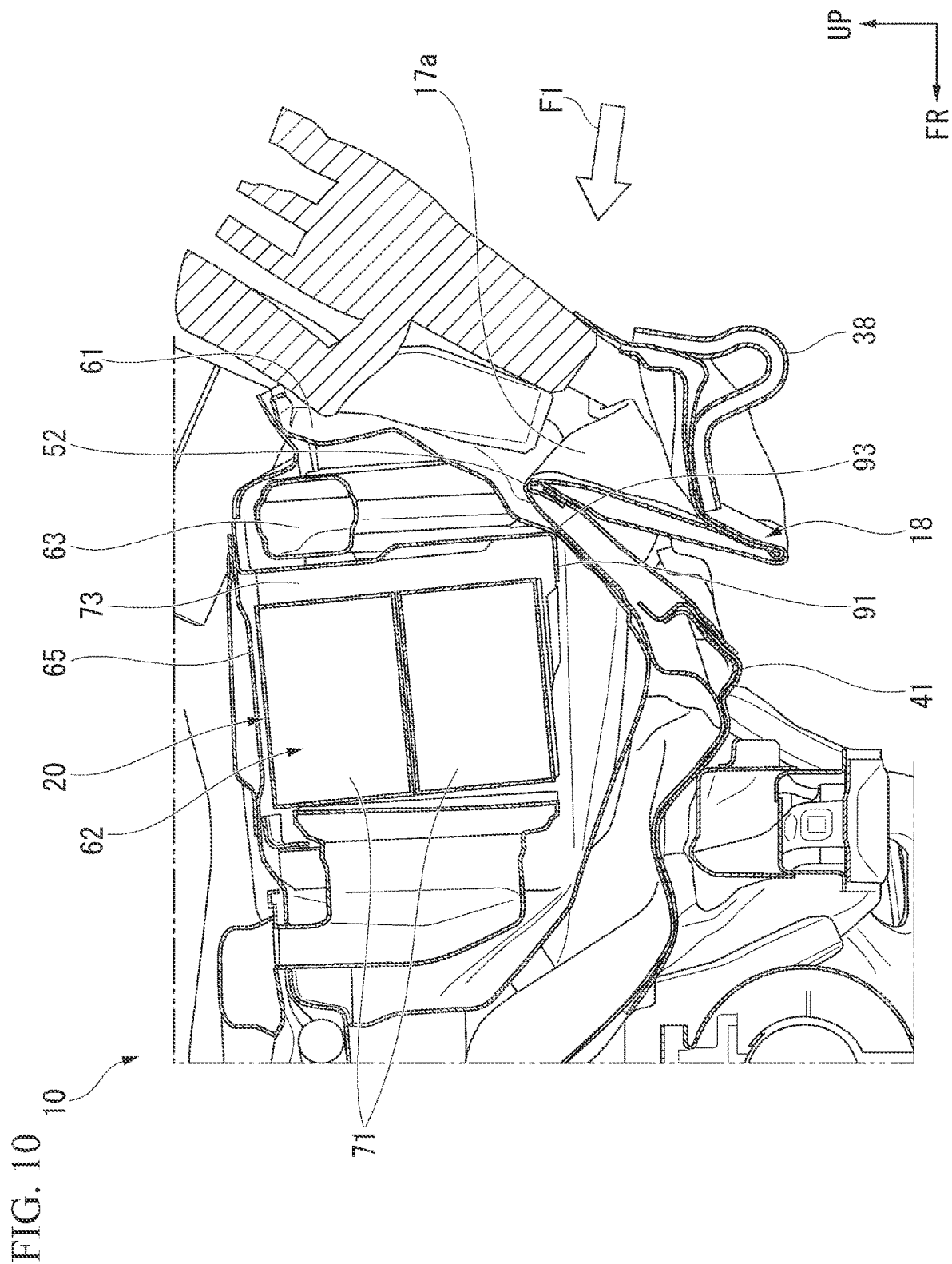
FIG. 10 is a cross-sectional view illustrating a state in which an impact load is input to the vehicle having the power storage device of one embodiment from the rear.

As described above, in the power storage device 20 of the embodiment, the fragile part 52 is formed in the pan member 18 as illustrated in FIGS. 4 and 10. The fragile part 52 is formed at a position separated rearward by L1 with respect to the power storage device 20. Therefore, the fragile part 52 is positioned behind the first protection part 91 of the power storage device 20.

In this state, for example, when the impact load F1 is input from the rear due to a rear surface collision, the pan member 18 is deformed to be pushed upward with the fragile part 52 as a starting point by the input impact load F1. The pan bottom portion 17a is also deformed by being pushed upward following the deformation of the pan member 18.

That is, the pan member 18 or the pan bottom portion 17a is deformed to push the power storage device 20 upward from below by the impact load F1 on a vehicle lower side of the power storage device 20.

Therefore, the first protection part 91 is made to extend toward the front from the lower side of the rear plate 75. Further, the extended first protection part 91 is disposed below the rectangular battery group 71, the left side plate 72 (see FIG. 7), and the right side plate 73.

Therefore, when the pan member 18 or the pan bottom portion 17a is deformed to push the power storage device 20 upward from below by the impact load F1, the deformed pan member 18 and the pan bottom portion 17a can be received by the first protection part 91 (particularly, the protection corner part 93). Therefore, the load from the pan member 18 or the pan bottom portion 17a generated due to the push-up of the pan member 18 or the pan bottom portion 17a can be absorbed by the first protection part 91.

Thereby, the rectangular battery group 71 (that is, the battery module 62) can be protected from the impact load F1. Therefore, the battery module can be protected without increasing the number of parts or a weight of the power storage device 20, and furthermore, without increasing a size or costs of the frame structure supporting the power storage device 20.

Also, the load generated by the push-up of the pan member 18 or the pan bottom portion 17a can be absorbed by the first protection part 91. Thereby, there is no need to provide the protection part, for example, over the entire region of the rectangular battery group 71 (that is, the battery module), and a setting range of the protection part can be kept as small as that of the first protection part 91.

Further, as illustrated in FIGS. 4, 7, and 8, the second left protection part 85 is made to extend in the vehicle width direction from the lower side of the left side plate 72. Also, the second right protection part 86 is made to extend in the vehicle width direction from the lower side of the right side plate 73. Here, the first protection part 91 (particularly, the first left protection part 95 and the first right protection part 96) of the rear plate 75 is positioned below the left side plate 72 and the right side plate 73. That is, the second left protection part 85 is disposed to overlap the first left protection part 95 from a side to the rear to a side therebelow. Also, the second right protection part 86 is disposed to overlap the first right protection part 96 from a side to the rear to a side therebelow.

Thereby, when the load due to the push-up in an arrow A direction from the pan member 18 or the pan bottom portion 17a is input to the first protection part 91, the first left protection part 95 can be supported by the second left protection part 85, and the first right protection part 96 can be supported by the second right protection part 86. Therefore, when the load due to the push-up from the pan member 18 or the pan bottom portion 17a is input, particularly a portion of the first protection part 91 excluding the first left protection part 95 and the first right protection part 96 can be satisfactorily deformed by the load due to the push-up. As a result, the load due to the push-up from the pan member 18 or the pan bottom portion 17a can be suitably absorbed.

In addition, the second left protection part 85 and the second right protection part 86 are made to extend outward in the vehicle width direction of the rectangular battery group 71. Therefore, the first protection part 91 can be supported by the second left protection part 85 and the second right protection part 86 on an outer side in the vehicle width direction of the rectangular battery group 71.

Thereby, for example, even when the second left protection part 85 or the second right protection part 86 is deformed by the load due to the push-up from the pan member 18 or the pan bottom portion 17a, the second left protection part 85 or the second right protection part 86 coming into contact with the rectangular battery group 71 can be curbed. Therefore, the rectangular battery group 71 can be more satisfactorily protected against the load due to the push-up from the pan member 18 or the pan bottom portion 17a.

Also, when the second left protection part 85 and the second right protection part 86 are made to extend outward in the vehicle width direction, a large region of the first protection part 91 in the vehicle width direction can be secured. Thereby, the load due to the push-up from the pan member 18 or the pan bottom portion 17a can be suitably absorbed by the first protection part 91. Therefore, the rectangular battery group 71 can be more satisfactorily protected.

As illustrated in FIGS. 3 and 10, the power storage device 20 is supported in a state of being suspended from the left rear frame 26 and the right rear frame 28 (that is, the vehicle body of the vehicle 10) via the support member 66. Therefore, for example, some of the load due to the push-up from the pan member 18 or the pan bottom portion 17a can be transmitted (load path) to the vehicle body of the vehicle 10. Thereby, deformation of the first protection part 91 due to the load from the pan member 18 or the pan bottom portion 17a can be suppressed.

As illustrated in FIGS. 7, 8 and 10, the protruding part 97 is formed between the first left protection part 95 and the first right protection part 96 while avoiding the second left protection part 85 and the second right protection part 86. The protruding part 97 protrudes downward with respect to the portions overlapping the second left protection part 85 and the second right protection part 86 (for example, the first left protection part 95 and the first right protection part 96).

Therefore, sufficient deformation of the first protection part 91 (that is, the protruding part 97) can be secured with respect to the load due to the push-up from the pan member 18 or the pan bottom portion 17a. Thereby, the load due to the push-up from the pan member 18 or the pan bottom portion 17a can be more suitably protected by the protruding part 97 of the first protection part 91 that is made to protrude downward.

Further, the technical scope of the present invention is not limited to the above-described embodiments, and various modifications can be made within a range not departing from the meaning of the present invention.

In addition, the components in the above-described embodiments can be appropriately replaced with well-known components within a range not departing from the meaning of the present invention, and the modified examples described above may be appropriately combined.

What is claimed is:

1. A vehicle body structure comprising a power storage device which is disposed in a recessed part formed in a floor part of a vehicle, wherein
   the power storage device includes:
   a laminate in which a plurality of cells are laminated;
   a pair of side plates provided at both end portions of the laminate in a vehicle width direction;
   a rear plate disposed on a vehicle rear side in the laminate; and
   a support member fixing the power storage device to the vehicle and supporting it in a suspending manner,
   the rear plate includes a protection part extending from a lower side thereof toward a vehicle front side and positioned below the laminate and the pair of side plates,
   the rear plate is positioned on the vehicle front side with respect to a fragile part which is formed in a member provided below the recessed part and extending in a front-rear direction of the vehicle,
   the pair of side plates each included another protection part extending in the vehicle width direction from a lower side of each respective side plate, and
   the another protection part extends outward in the vehicle width direction.

2. The vehicle body structure according to claim 1, wherein an upper surface portion of the side plate is fixed to the support member.

3. The vehicle body structure according to claim 1, wherein a portion of the protection part which avoids the another protection part protrudes downward with respect to a portion thereof overlapping the another protection part.

* * * * *